United States Patent
Coleman et al.

(10) Patent No.: US 8,328,362 B2
(45) Date of Patent: Dec. 11, 2012

(54) WAVEPLATE COMPENSATION IN PROJECTION POLARIZATION CONVERSION SYSTEM

(75) Inventors: David A. Coleman, Louisville, CO (US); Miller H. Schuck, Erie, CO (US); Gary D. Sharp, Boulder, CO (US); Scott E. Gilman, Lyons, CO (US)

(73) Assignee: RealD Inc., Beverly Hills, CA (US)

( * ) Notice: Subject to any disclaimer, the term of this patent is extended or adjusted under 35 U.S.C. 154(b) by 133 days.

(21) Appl. No.: 13/034,643

(22) Filed: Feb. 24, 2011

(65) Prior Publication Data
US 2011/0205495 A1 Aug. 25, 2011

Related U.S. Application Data

(60) Provisional application No. 61/307,786, filed on Feb. 24, 2010.

(51) Int. Cl.
G03B 21/14 (2006.01)

(52) U.S. Cl. ............ 353/20; 353/7; 353/8; 353/30; 353/31; 353/37; 353/38; 353/98; 353/122; 359/489.06; 359/489.07; 349/18; 349/96

(58) Field of Classification Search .......... 353/7, 8, 353/20, 30, 31, 37, 38, 98, 122; 349/5–10, 349/18, 96, 193, 194; 359/489.07, 189.15, 359/489.06, 487.06; 348/E5.133, E5.141, 348/E9.027, 106; 362/19
See application file for complete search history.

(56) References Cited

U.S. PATENT DOCUMENTS

| | | | | |
|---|---|---|---|---|
| 4,995,718 A | * | 2/1991 | Jachimowicz et al. | 353/31 |
| 5,231,521 A | * | 7/1993 | Johnson et al. | 349/18 |
| 5,537,256 A | * | 7/1996 | Fergason | 359/484.06 |
| 5,847,790 A | * | 12/1998 | Andersson et al. | 349/100 |
| 5,999,240 A | * | 12/1999 | Sharp et al. | 349/119 |
| 6,934,066 B2 | * | 8/2005 | Berman et al. | 359/256 |
| 7,477,206 B2 | | 1/2009 | Cowan | |
| 7,528,906 B2 | | 5/2009 | Robinson | |
| 7,857,455 B2 | | 12/2010 | Cowan | |

(Continued)

FOREIGN PATENT DOCUMENTS

JP 09-265070 10/1997

(Continued)

OTHER PUBLICATIONS

International search report and written opinion of the international searching authority in PCT/US11/26131 mailed Nov. 4, 2011.

*Primary Examiner* — Georgia Y Epps
*Assistant Examiner* — Sultan Chowdhury
(74) *Attorney, Agent, or Firm* — Baker & McKenzie LLP

(57) ABSTRACT

Three dimensional projection systems may be single projector or multiple projector systems. These 3D projection systems may include a polarization conversion system (PCS). The PCS may be designed for relatively small throw ratios and thus, may be designed to accommodate the small throw ratios. The PCS may include a polarizing beam splitter, a first optical stack, a reflector and a second quarter wave retarder. The first optical stack may include a rotator, a polarizer, a polarization switch and a first quarter wave retarder. The PCS may receive light from a projector and the PBS may direct the light toward the first optical stack. The light may be converted to a different polarization state as it passes through the first optical stack. The converted light may then be re-directed by a reflecting element to the second quarter wave retarder. The second quarter wave retarder may convert linearly polarized light to circularly polarized light.

20 Claims, 3 Drawing Sheets

U.S. PATENT DOCUMENTS

| | | | |
|---|---|---|---|
| 8,066,382 B2 * | 11/2011 | Silverstein et al. | 353/20 |
| 2002/0191235 A1 | 12/2002 | Connor et al. | |
| 2005/0041289 A1 * | 2/2005 | Berman | 359/495 |
| 2007/0070501 A1 * | 3/2007 | Wen et al. | 359/501 |
| 2008/0225236 A1 | 9/2008 | Schuck | |
| 2009/0185086 A1 * | 7/2009 | Chen et al. | 349/8 |

FOREIGN PATENT DOCUMENTS

| | | |
|---|---|---|
| JP | 2009-015128 | 1/2009 |
| KR | 10-2009-0089325 | 10/1997 |
| KR | 10-2004-007812 | 9/2004 |
| KR | 10-2009-0094224 | 9/2009 |

* cited by examiner

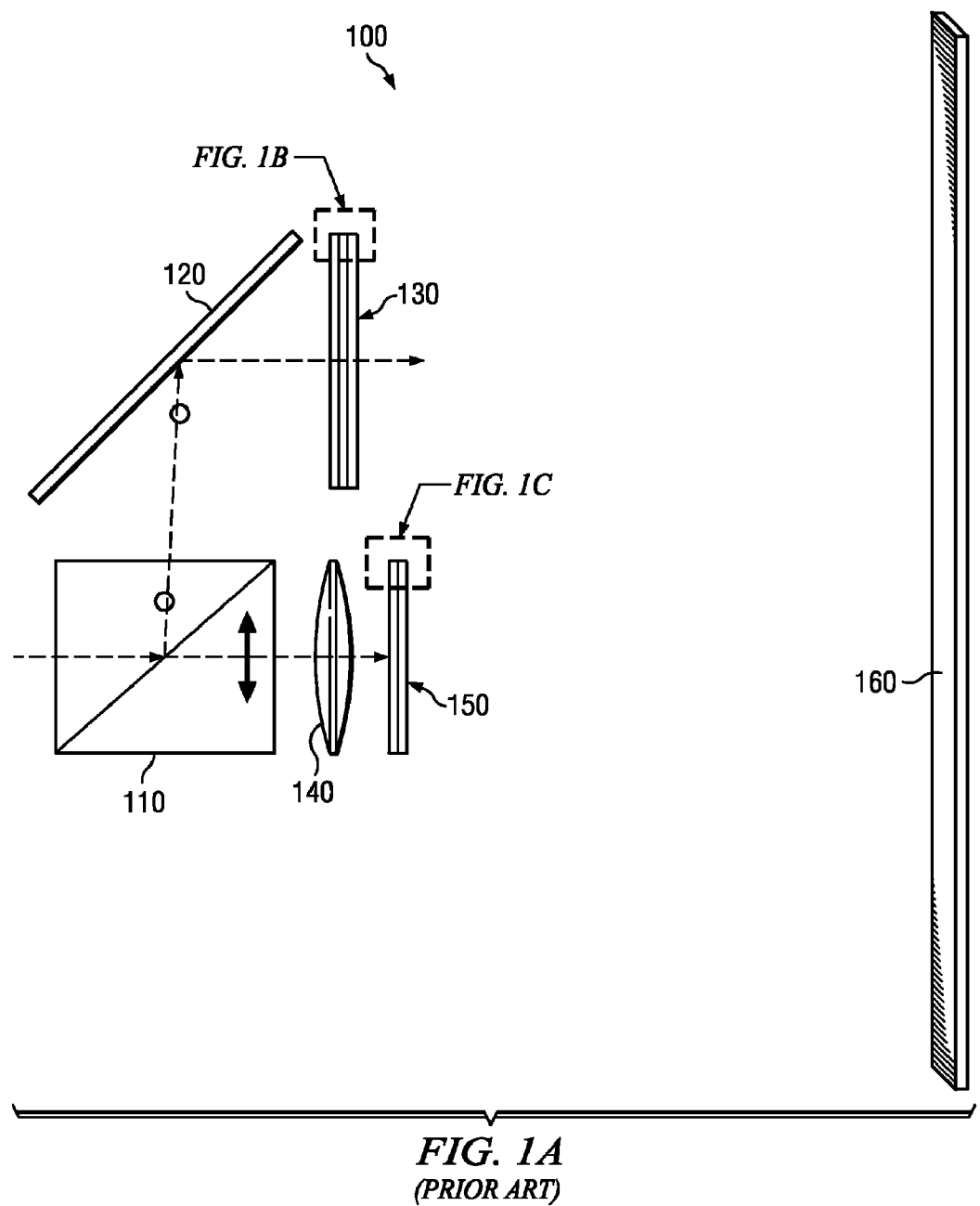
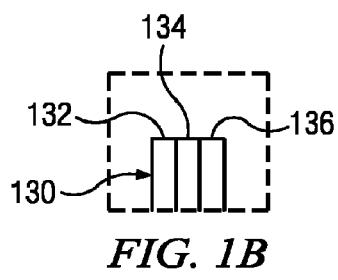
FIG. 1B
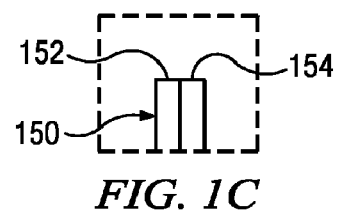
FIG. 1C
FIG. 1A
(PRIOR ART)

WAVEPLATE COMPENSATION IN PROJECTION POLARIZATION CONVERSION SYSTEM

CROSS-REFERENCE TO RELATED APPLICATIONS

This application claims priority to U.S. Provisional Patent Application Ser. No. 61/307,786, filed Feb. 24, 2010, entitled "Waveplate compensation in projection polarization conversion system," the entirety of which is herein incorporated by reference.

TECHNICAL FIELD

The present disclosure generally relates to projection systems, and more specifically, to stereoscopic projection systems.

BACKGROUND

Generally, polarization conversion systems (PCS) may be used for three dimensional (3D) projection as described in commonly-owned U.S. Pat. No. 7,857,455 and U.S. Pub. No. 2008/0225236, which are hereby incorporated by reference in their entirety. PCSs may be used with one or more projectors in a 3D projection system. One attribute of projection systems is the throw ratio, which may be the approximate distance from projector-to-screen divided by the screen width. In cinema theaters, throw ratios may typically vary from approximately 0.9 to greater than 5. Other applications, such as home or office projection systems, may have even lower throw ratios. As throw ratio decreases, the component size for a PCS system may increase, possibly resulting in less cost-effective, manufacturable, and/or saleable sizes.

BRIEF SUMMARY

According to the present disclosure, a polarization conversion system may include a polarizing beam splitter (PBS) operable to receive incoming light and may separate the incoming light into a first light bundle with a first state of polarization (SOP) and a second light bundle with a second state of polarization (SOP) and the first SOP may be orthogonal to the second SOP. The PCS may also include a first optical stack operable to receive the first light bundle from the PBS, and the first optical stack may include a rotator, a first polarizer, a first polarization switch, and a first quarter wave retarder. Further, the PCS may include a reflector operable to receive the first light bundle from the first optical stack, and a second quarter wave retarder operable to receive the first light bundle from the mirror. The lens set may be operable to receive the second light bundle from the PBS. The PCS may further include a second optical stack operable to receive the second light bundle from the lens set, and the second optical stack may include a second polarizer and a second polarization switch. The PBS may be any type of PBS including a cube PBS, a wire grid PBS, a retarder based PBS, a plate PBS and so on. The first quarter wave retarder may have an optic axis orientation of either one of approximately +/−45 degree relative to the vertical axis and the second quarter wave retarder may have an optic axis orientation of either one of approximately −/+45 degree relative to the vertical axis. It should be noted that the term "vertical axis" is used for convenience in order to describe an axis parallel to the plane of incidence on the mirror. Further, the first light bundle may be S-polarized light and the second light bundle may be P-polarized light.

According to another aspect, the present application discloses a method for providing a polarization conversion system. The method may include providing a polarizing beam splitter (PBS) which may be operable to receive incoming light and may be operable to separate the incoming light into a first light bundle with a first state of polarization (SOP) and a second light bundle with a second state of polarization (SOP) in which the first SOP is orthogonal to the second SOP. The method may also include providing a first optical stack operable to receive the first light bundle from the PBS, and the first optical stack may include a rotator, a first polarizer, a first polarization switch and a first quarter wave retarder. The method may include providing a reflector operable to receive the first light bundle from the first optical stack, and may provide a second quarter wave retarder operable to receive the first light bundle from the reflector. Additionally, the method may include providing a lens set which may be operable to receive the second light bundle from the PBS, and a second optical stack which may be operable to receive the second light bundle from the lens set, and in which the second optical stack may include a second polarizer and a second polarization switch. The first light bundle may be S-polarized light and the second light bundle may be P-polarized light.

According to another aspect, the present application discloses a projection system which may include a projector which may be operable to provide light in the direction of a projection screen, and a polarization conversion system which may be operable to receive light from the projector. The polarization conversion system may include a polarizing beam splitter (PBS) which may be operable to receive incoming light and which may be operable to separate the incoming light into a first light bundle with a first state of polarization (SOP) and a second light bundle with a second state of polarization (SOP), and in which the first SOP may be orthogonal to the second SOP. The projection system may also include an optical stack which may be operable to receive the first light bundle from the PBS, and the optical stack may include a rotator, a polarizer, a polarization switch and a first quarter wave retarder. The reflector may be operable to receive the first light bundle from the optical stack, and a second quarter wave retarder may be operable to receive the first light bundle from the reflector.

BRIEF DESCRIPTION OF THE DRAWINGS

FIG. 1A is a schematic diagram illustrating a conventional projector polarization conversion system;

FIG. 1B is a schematic diagram illustrating one embodiment of an exploded view of an optical stack;

FIG. 1C is a schematic diagram illustrating another embodiment of an exploded view of another optical stack;

DETAILED DESCRIPTION

Figure 2A:
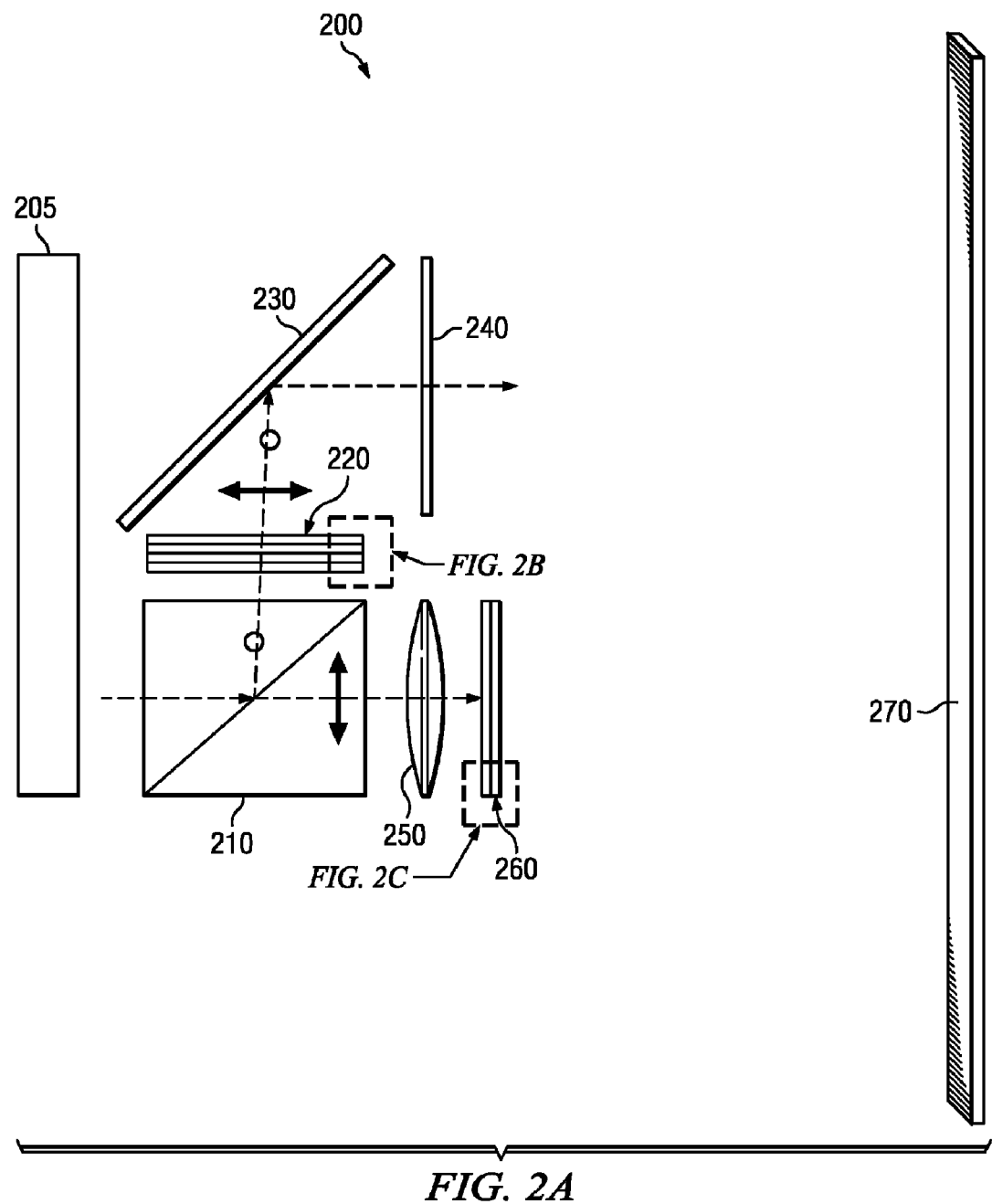
FIG. 2A is a schematic diagram illustrating one embodiment of a projector polarization conversion system, in accordance with the present disclosure.

Various embodiments of polarization conversion systems that receive light are described. The polarization conversion systems present a brighter image and utilize polarized light for three-dimensional viewing.

It should be noted that embodiments of the present disclosure may be used in a variety of optical systems and projection systems. The embodiment may include or work with a variety of projectors, projection systems, optical components, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the invention may be set forth in different combinations and arrangements to define inventions unique in their own right. Also, the terminology used herein is for the purpose of description and not of limitation.

FIG. 1A is a schematic diagram illustrating a conventional polarization conversion system. Generally, a PCS may include, but is not limited to, a polarizing beam splitter, one or more reflectors, a rotator and one or more polarization switches, arranged as shown in the various embodiments described in commonly-owned U.S. Pat. No. 7,857,455 or U.S. Pub. No. 2008/0225236, both herein incorporated by reference. The PCS may also include a lens set. In one example, randomly polarized light from a projector enters a PCS, and the randomly polarized light is separated by a polarizing beam splitter (PBS) into orthogonal polarization states, such as P and S states of polarization, and along first and second optical paths. Continuing the example, each of the polarized light states may then pass to one or more polarization switches. The polarization states of light in each path may be alternated in synchrony with left and right eye image frames addressed to a projector panel. The images from the two optical paths may be overlaid on-screen by adjustment of the reflector (or mirror) tilt and lens set magnification. A polarization preserving screen, such as a silver screen may reflect the polarized light back to an audience, and passive eyewear, which may include left and right circular polarizer stacks, may substantially transmit left and right imagery to the appropriate eye.

As shown in FIG. 1A, a PCS 100 may include a polarizing beam splitter 110, a reflector 120, a first optical stack 130, and a screen 160. Reflector 120 may be any reflection device that directs incoming light to another direction, such as a mirror, a prism, et cetera. FIG. 1B is a schematic diagram illustrating the first optical stack 130. The first optical stack 130 may include a rotator 132, a first polarizer 134, and a first polarization switch 136, arranged as shown. The rotator 132 may be on the reflector 120 side and the first polarization switch 136 may be located on the screen 160 side. Additionally, PCS 100 may include a lens set 140 and a second optical stack 150. FIG. 1C is a schematic diagram illustrating the second optical stack 150. The second optical stack 150 may include a second polarizer 152 and a second polarization switch 152. The second polarizer 152 may be located on the lens set 140 side and the second polarization switch 152 may be located on the screen 160 side. The lens set 140 may be located along the second light path and between the PBS 110 and the second optical stack 150.

In operation, randomly polarized image light energy is input to the PBS 110, which may separate the incoming randomly polarized light into orthogonal polarization states, such as an S-state of polarization and a P-state of polarization. At the PBS interface, the S- and P-polarized light states are directed along different light paths, on a first light path and a second light path. After leaving the PBS 110 through an exit port, the S-state polarized light may encounter a reflector 120. The reflector 120 directs the incoming polarized light to the first optical stack 130. The reflector 120 may be a mirror, but typically, metal mirrors may reflect S- and P-polarization states with different efficiencies. Additionally, a non-zero phase difference may also be generated between S- and P-polarization states on reflection. For a circular polarization state incident on the mirror, the resulting reflected state may no longer be circular but may be undesirably skewed into elliptically polarized light. When sent to the screen and viewed through passive eyewear that is designed to filter circularly polarized light, this resulting undesirable elliptical state of polarization will produce less transmitted light to the intended eye and more leakage light to the unintended eye. The effect is a lowering of brightness and an increase in leakage, crosstalk, or ghosting in the 3D imagery.

In one embodiment employing polarization switches and as shown in FIGS. 2A, 2B, 2C, and 2D, the circular polarization states incident on the mirror may instead be converted to linear states, and may be oriented along the eigenpolarizations of the mirror. Stated differently, the linear polarization states may be oriented approximately parallel or perpendicular to the plane of incidence. In one example, this may be accomplished by placing a passive zero-order quarter waveplate between the polarization switch and mirror, and orienting the quarter waveplate approximately parallel to the rubbing direction of at least one of the ZScreen pi-cells. Further, the PCSs of FIGS. 2A, 2B, 2C, and 2D may employ active polarization switches and waveplate compensation around a turn mirror. In each of the systems of FIGS. 2A, 2B, 2C, and 2D, optionally, a linear polarizer may be added prior to the polarization switch to increase the polarization purity of the light and enhance the final system contrast. The term quarter waveplate may be used herein for purposes of discussion only, and may also be used interchangeably with quarter wave plate.

The polarization switch may function as a quarter wave retarder with an approximately 90-degree switchable orientation, thus one of these states may be crossed with the passive QW retarder. The result may be an approximately linear state for most or all visible wavelengths, and may thus, result in little to no opportunity for the mirror to distort the state of polarization. The alternate state may approximately correspond to the sum of LC QW and passive QW retardation or a net zero-order half-wave, and may result in a polarization state that may be linear for a single wavelength. Since the SOP may be, in general, mixed at the mirror, the polarization can be distorted, and may result with implications on system contrast. Some examples of polarization switches may include, but are not limited to, the ZScreen, for example, as taught in commonly-owned U.S. Pat. No. 7,477,206, and Achromatic Polarization Switches, as described in commonly-owned U.S. Pat. No. 7,528,906, which is hereby incorporated by reference in its entirety.

By employing a zero-order quarter waveplate before the mirror, assuming the mirror is not polarization preserving, the contrast from the reflected path may be different for each eye. In this example, the zero-order quarter waveplate may be a zero-order quarter wave retarder. Since the ZScreen modulator may be chromatic, it may be difficult to produce two perfect orthogonal linear states at the mirror. However, it may be possible to balance the contrast between the two states. By using an achromatic quarter wave retarder, the dispersion may be substantially balanced between the two states of the ZScreen.

The quasi linearly polarized light incident on the mirror may be more uniformly affected by the mirror properties. Generally, S- or P-linearly polarized light may reflect from the mirror with the state of polarization substantially unaltered. The amplitude of the light may be reduced and the phase of the light may be changed, but these changes may not affect the final system contrast as the linear state remains substantially linear and un-rotated. For systems that may employ circular polarization at the screen, a matching quarter waveplate may be located after the mirror to substantially reinstate the circular polarization state. Dispersion effects in the quarter waveplates may be addressed by rotating two plates such that their fast-axes are at 90 degrees to each other in the plane perpendicular to the optical path.

Note that for skew rays impinging on the mirrors, the linearly polarized light will still see some rotation and induced phase difference. In this case, the contrast will degrade, but not as significantly as when circularly polarized light impinges on the mirror.

FIG. 2A is a schematic diagram illustrating one embodiment of a projector polarization conversion system (PCS) 200. An embodiment of PCS 200 may include a polarizing beam splitter (PBS) 210, a first optical stack 220, a reflecting element 230, a second quarter wave retarder 240, a second optical stack 260, and a screen 270 arranged as shown. In some embodiments, the PCS 200 may also include a lens set 250. The PCS 200 may receive light from a projector 205 and may transmit light to the screen 270.

Figure 2B:
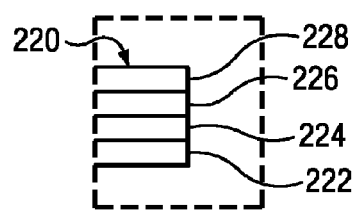
FIG. 2B is a schematic diagram illustrating one embodiment of an exploded view of an optical stack, in accordance with the present disclosure.

FIG. 2B is a schematic diagram illustrating an exploded view of first optical stack 220 shown in FIG. 2A. The first optical stack 220 may include a polarization rotator 222, a first polarizer 224, a first polarization switch 226, and a first quarter wave retarder 228, arranged as shown. Additionally, the first optical stack may be placed before the reflector 230 in the first light path. Such placement may be desirable in projection systems with smaller throw ratios.

Figure 2C:
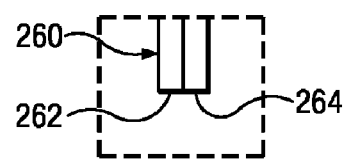
FIG. 2C is a schematic diagram illustrating another embodiment of an exploded view of another optical stack, in accordance with the present disclosure.

FIG. 2C is a schematic diagram illustrating an exploded view of second optical stack 260 shown in FIG. 2A. The second optical stack 260 may include a second polarizer 262 (on the lens set 250 side) and a second polarization switch 264 (on the screen 270 side), arranged as shown. In some embodiments, the first optical stack 220 of FIGS. 2A and 2B may be arranged as shown, or in other embodiments, elements of the first optical stack 220 may be absent and/or additional elements may be included. In one example, the first polarizer 224 may be omitted from the first optical stack 220 and/or the second polarizer 262 may be omitted from the second optical stack 260. Furthermore, the elements of the first optical stack 220 may be arranged in a different configuration.

In operation, randomly polarized image light energy is input from the projector 205 and the randomly polarized light may enter the PCS 200. The randomly polarized light may then enter the PBS 210. The PBS 210 separates the incoming randomly polarized image light energy into different, orthogonal polarization states. Additionally, in one example, the PBS 210 may transmit P-polarized light toward the lens set 250 and may reflect S-polarized light toward the first optical stack 220. Vice versa, in another example, the PBS 210 may transmit S-polarized light toward the lens set 250 and may reflect P-polarized light toward the first optical stack 220. As discussed herein, the orthogonal polarization states may be referred to interchangeably as S-polarized light and P-polarized light, first light bundles and second light bundles.

In the operation of the embodiment of FIG. 2A, the S-state polarized light may travel along the first light path and may be reflected through an exit port of the PBS 210 and encounter the first optical stack 220. The S-state polarized light may then encounter the polarization rotator 222 of the first optical stack 220. The S-polarized light reflected by the PBS 210 may pass through the polarization rotator 222 and may be rotated by approximately 90 degrees to match the polarization state of the p-polarized light. The first light path may then travel to the polarizer 224 which may function as a clean up polarizer and may be optionally included in the first optical stack 220. Stated differently, the polarizer 224 may be a linear polarizer which may be included prior to the polarization switch to increase the polarization purity of the light and enhance the final system contrast. Although as discussed herein, p-polarized light may be transmitted through the PBS 210 toward the lens set 250, while the s-polarized light may be directed toward the first optical stack 220, it should be apparent to a person of ordinary skill in the art that an alternative configuration may be employed in which p-polarized light may be directed toward the first optical stack 220, while s-polarized light may be transmitted through the PBS 210 toward the lens set 250.

Next, the polarization switch 226 may receive the light from the polarizer 224 and may selectively transform the incoming polarized light. As understood by one of ordinary skill in the art, the operation of the polarization switches may be substantially synchronized with the projection of the left eye and right eye images. The light may then pass to the first quarter wave retarder 228 which may convert the light to a linearly polarized light. Continuing along the first light path, the light may encounter the reflector 230 and the reflector 230 may substantially redirect the linearly polarized light further along the first light path, towards the second quarter wave retarder 260. The second quarter wave retarder 260 may convert the light to circularly polarized light and continue directing the light toward the projection screen 270.

Further in the operation of FIG. 2A, P-state light may be transmitted through the PBS 210 and may travel along the second light path to the lens set 250. The lens set 250 may adjust the magnification of the P-state light to approximately compensate for the extra optical path length in the S-state light path. The light may then pass through to the second optical stack 250 and encounter the second polarizer 252 and the second polarization switch 254. As previously discussed, the second polarizer 252 may be a clean up polarizer. Further as previously mentioned, the operation of the first and second polarization switches may be substantially synchronized with the projection of the left eye and right eye images.

In the embodiment of FIG. 2A, the PBS 210 is depicted as a cube PBS, as might be used in small throw ratio situations; however various types of PBSs may be used such as, but not limited to, a plate PBS, a retarder based PBS and a wire grid PBS. The PBS 210 in FIG. 2A may be implemented as a glass cube (with wire grid, polarization recycling film, or dielectric layers along the diagonal) to reduce astigmatism in the final image associated with light passing through a tilted plate. In another example, the PBS plate may be constructed using a wire grid layer on glass (e.g., Proflux polarizer from Moxtek in Orem, Utah), polarization recycling film (e.g., Double Brightness Enhancing Film from 3M in St. Paul, Minn.), polarization recycling film on glass (for flatness), or a multi-dielectric layer on glass.

In some embodiments, the reflecting element 230 of FIG. 2A may be a mirror, such as a turn mirror or fold mirror, or any type of reflective surface, such as a total internal reflection prism.

In some embodiments, the polarization rotator 222 in FIGS. 2A and 2B may be an achromatic half-wave plate. The half-wave plate may be implemented with polymer films (e.g., Achromatic Retardation Plate), quartz plates, printed retarder material, or a static liquid crystal device optionally patterned to account for geometric polarization alternation. The polarization rotator 222 may be positioned as shown in FIG. 2A, or in other embodiments, it may be positioned between the reflecting element 230 and the second quarter wave retarder 240. In one example, the rotator 222 may be created by a laminate of polymer waveplates. Although in most described embodiments herein, the polarization rotator 222 is located in the first light path, it may be placed in the second light path instead, and the PCS will operate in a similar manner and in accordance with the principles of the present disclosure.

In some embodiments, the first quarter wave retarder 228 may have an optic axis orientation of either one of approximately +/−45 degree relative to the vertical axis. Additionally, the second quarter wave retarder 260 may have an optic axis orientation of either one of approximately −/+45 degree relative to the vertical axis. It should be noted that the term "vertical axis" is used for convenience in order to describe an axis parallel to the plane of incidence on the mirror. Additionally, quarter wave retarders may be referred to herein as a quarter waveplate for purposes of discussion only, and not of limitation. The quarter wave retarders may be in the form of a plate, a deposited material layer, or any other form that appropriately retards the light with respect to the optic axis.

Figure 2D:
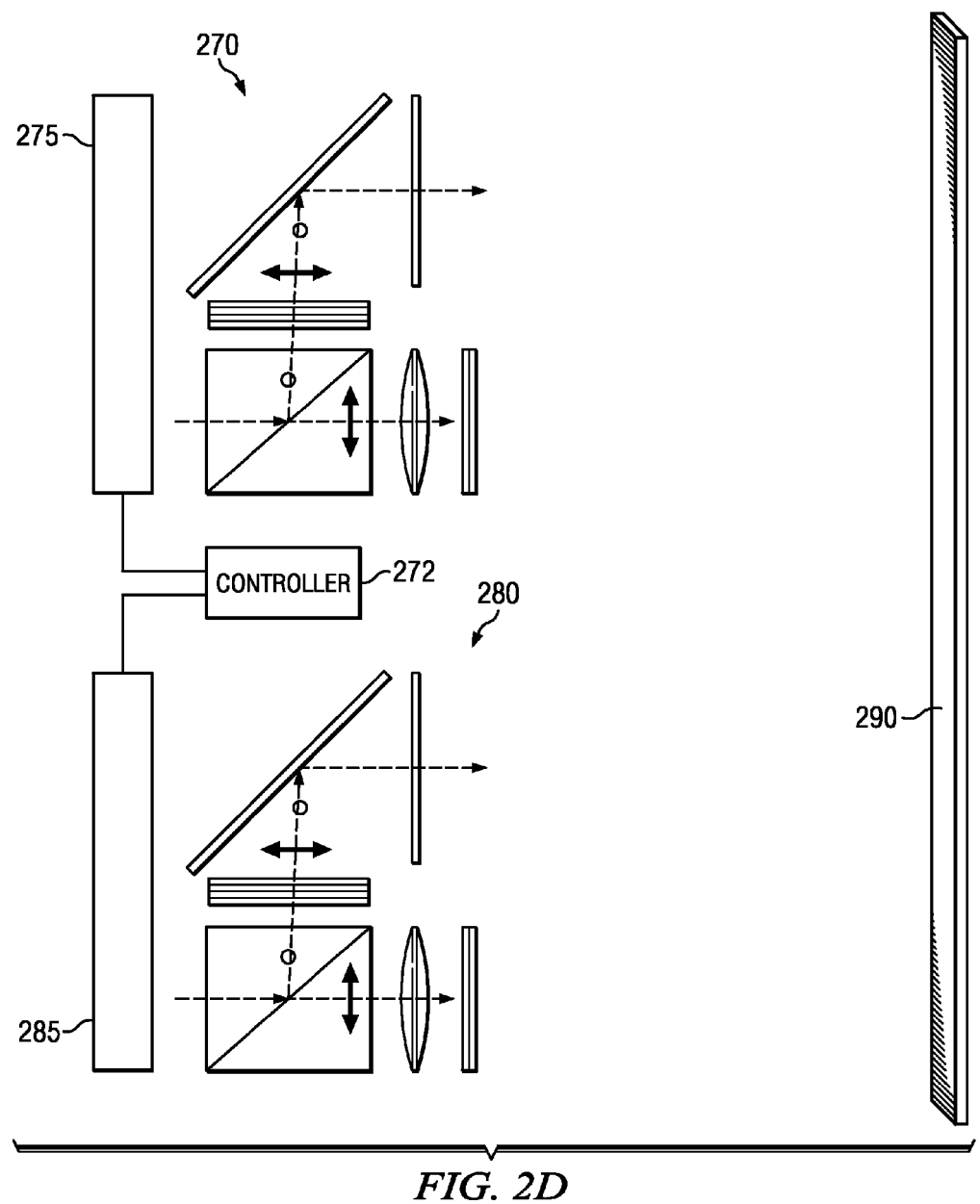
FIG. 2D is a schematic diagram illustrating another embodiment of a projector polarization conversion system, in accordance with the present disclosure.

FIGS. 2A and 2D illustrate a single and multiple projector polarization conversion systems respectively, each of which includes polarization switches and waveplate compensation. FIG. 2D is a schematic diagram illustrating another embodiment of a projector polarization conversion system. As illustrated in FIG. 2B, a projection system may include more than one PCS and may be used with more than one projector. FIG. 2B includes a first PCS 270, a first projector 275, a second PCS 280, a second projector 285, a controller 272 and a screen 290. PCS 270 and PCS 280 may each include the components of the PCS 200 of FIGS. 2A, 2B and 2C.

In operation PCS 270 may receive light from the first projector 275 and PCS 280 may receive light from the second projector 285. The first projector 275 and the second projector 285 may be linked via the controller 272 which may substantially synchronize the projection content and/or the left and right eye image. In one embodiment, the polarization switches may be substantially synchronized via the controller 272 so that both may show the left eye image and then both may show the right eye image, so that the resulting brightness of the projection system may increase. Additionally in another embodiment, the polarization switches of the PCSs 270 and 280 may be substantially synchronized with the right eye image projecting from the PCS 270 and the left eye image projecting from the PCS 280 or vice versa.

Additionally, in another embodiment for multiple projector systems and the polarization switches may be replaced with passive waveplate components. The passive waveplates may produce two distinct polarization states which, with matching eyewear, may substantially transmit left and right imagery to the appropriate eye after reflection from a polarization preserving screen. The projection system may not employ waveplate compensation around the reflector.

Notably, the first and second quarter waveplates are configured orthogonally to each other (e.g., first QWP at +45 degrees, and second QWP at −45 degrees, or vice-versa). In one embodiment of a passive projection system with multiple projectors, polarization switches may be replaced with passive quarter wave retarders. The PBS may produce a substantially linear polarization state at the reflector, and pairs of matching quarter wave retarders on either side of the mirror may not be employed.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than one percent to ten percent.

While various embodiments in accordance with the disclosed principles disclosed herein have been described above, it should be understood that they have been presented by way of example only, and are not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that certain technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:
1. A polarization conversion system comprising:
a polarizing beam splitter (PBS) operable to receive incoming light and separate the incoming light into a first light bundle with a first state of polarization (SOP) and a second light bundle with a second state of polarization (SOP), wherein the first SOP is orthogonal to the second SOP;
a first optical stack operable to receive the first light bundle from the PBS, wherein the first optical stack comprises a rotator, a first polarizer, a first polarization switch, and a first quarter wave retarder;

a reflector operable to receive the first light bundle from the first optical stack; and a second quarter wave retarder operable to receive the first light bundle from the reflector.

2. The polarization conversion system of claim 1 further comprising a lens set operable to receive the second light bundle from the PBS.

3. The polarization conversion system of claim 2, further comprising a second optical stack operable to receive the second light bundle from the lens set, wherein the second optical stack further comprises a second polarizer and a second polarization switch.

4. The polarization conversion system of claim 1, wherein the PBS is a cube PBS.

5. The polarization conversion system of claim 1, wherein the first quarter wave retarder has an approximately +45 degree configuration relative to the optic axis of the first polarizer.

6. The polarization conversion system of claim 5, wherein the second quarter wave retarder has an approximately −45 degree configuration relative to the optic axis of the first polarizer.

7. The polarization conversion system of claim 1, wherein the first light bundle is S-polarized light and wherein the second light bundle is P-polarized light.

8. The polarization conversion system of claim 1, wherein the PBS is a wire grid PBS.

9. The polarization conversion system of claim 1, wherein the PBS is a retarder based PBS.

10. The polarization conversion system of claim 1, wherein the rotator is an achromatic half-wave plate.

11. The polarization conversion system of claim 3, wherein the first polarization switch and the second polarization switch are substantially synchronized to alternately project left and right eye images.

12. A waveplate compensation method for providing a polarization conversion system, the method comprising:

receiving incoming light at a polarizing beam splitter (PBS) wherein the PBS separates the incoming light into a first light bundle and a second light bundle;

receiving the first light bundle from the PBS at a first optical stack wherein the first optical stack further comprises, a rotator, a first polarizer, a first polarization switch and a first quarter wave retarder;

receiving the first light bundle from the first optical stack at a reflecting element; and receiving the first light bundle from the reflecting element at a second quarter wave retarder.

13. The waveplate compensation method of claim 12, wherein the first light bundle has a first state of polarization (SOP) and the second light bundle has a second state of polarization (SOP) further wherein the first SOP is orthogonal to the second SOP.

14. The waveplate compensation method of claim 12, further comprising receiving the second light bundle from the PBS at a lens set.

15. The waveplate compensation method of claim 12, and a second optical stack operable to receive the second light bundle from the lens set, wherein the second optical stack further comprises a second polarizer and a second polarization switch.

16. The waveplate compensation method of claim 12, wherein the first light bundle is S-polarized light and the second light bundle is P-polarized light.

17. The waveplate compensation method of claim 12, wherein the rotator rotates the first light bundle by 90 degrees relative to the optic axis.

18. The waveplate compensation method of claim 12, wherein the first quarter wave retarder has an optic axis orientation of at least one of an approximately +45 degree orientation relative to the plane of incidence and an approximately −45 degree orientation relative to the plane of incidence.

19. The waveplate compensation method of claim 12, wherein the second quarter wave retarder converts the first light bundle from linearly polarized light to circularly polarized light.

20. A projection system comprising:

a projector operable to provide light in the direction of a projection screen; and a polarization conversion system operable to receive light from the projector, wherein the polarization conversion system further comprises:

a polarizing beam splitter (PBS) operable to receive incoming light and separate the incoming light into a first light bundle with a first state of polarization (SOP) and a second light bundle with a second state of polarization (SOP), wherein the first SOP is orthogonal to the second SOP;

an optical stack operable to receive the first light bundle from the PBS, wherein the optical stack further comprises, a rotator, a polarizer, a polarization switch and a first quarter wave retarder;

a reflector operable to receive the first light bundle from the optical stack; and a second quarter wave retarder operable to receive the first light bundle from the reflector.

* * * * *